Sept. 20, 1932.   R. STERN   1,878,610
TESTING DEVICE
Filed June 13, 1929
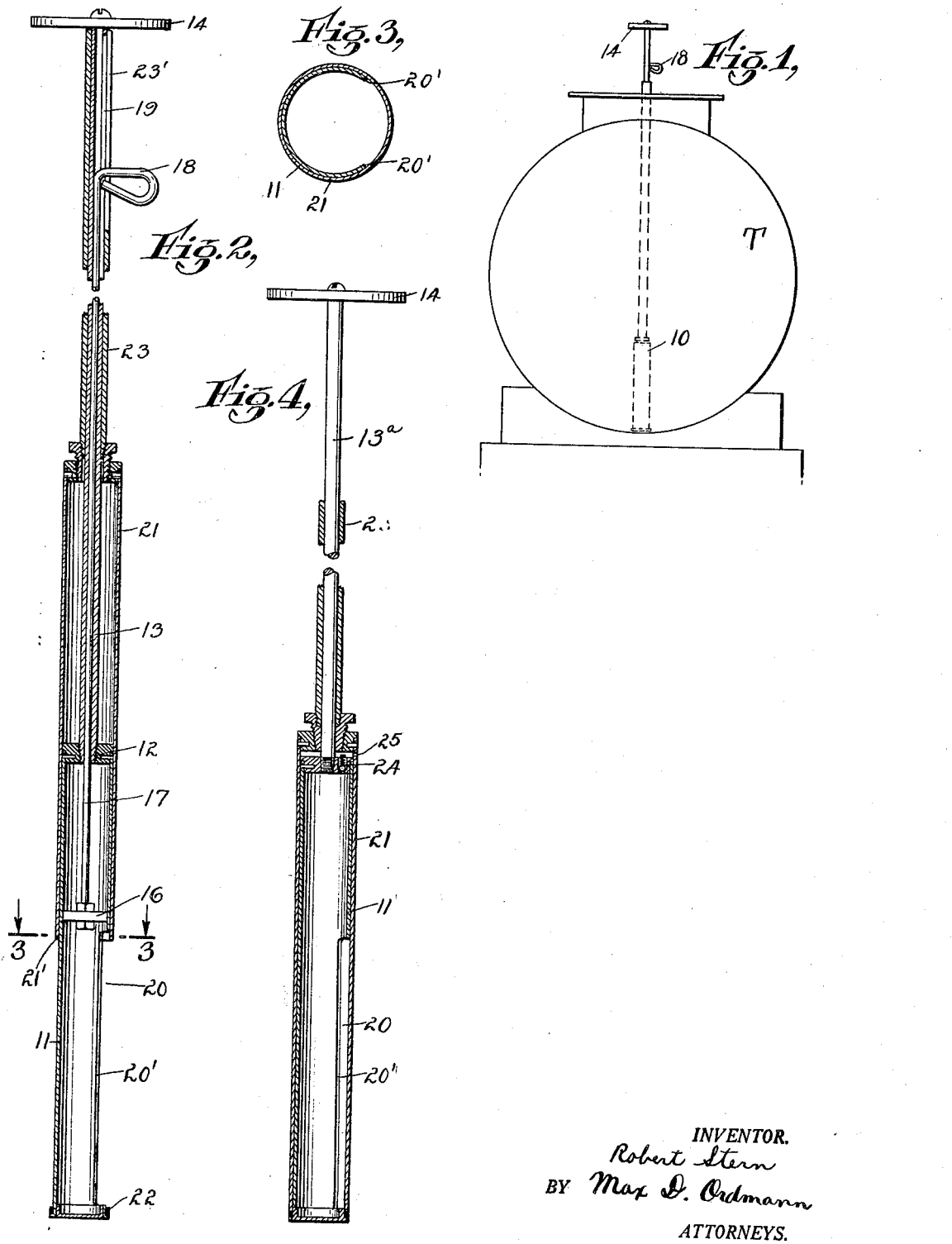
INVENTOR.
Robert Stern
BY Max D. Ordmann
ATTORNEYS.

Patented Sept. 20, 1932

1,878,610

UNITED STATES PATENT OFFICE

ROBERT STERN, OF UNION CITY, NEW JERSEY, ASSIGNOR TO LOUIS STERN SONS, INC., OF KEARNY, NEW JERSEY

TESTING DEVICE

Application filed June 13, 1929. Serial No. 370,472.

The present invention relates to sampling devices employed for the purpose of sampling oils, greases or the like in tanks, barrels and other receptacles.

With devices of this type which have been hitherto used it has been impossible in testing to obtain true samples of the material at the bottom of the containers. A primary object, therefore, of the present device is to provide a tester that will render this possible.

A further object is to provide a tester which is convenient to manipulate and which gives positive results.

Still another object is to provide a tester which is comparatively easy and cheap to manufacture.

With the above and other objects in view my invention consists in the novel construction, arrangement and combination of elements to be hereinafter more fully described and shown in the accompanying drawing which forms part of this specification, and in which similar reference characters denote corresponding parts.

Fig. 1 is a diagrammatic view of one form of my device in position of use in a tank car.

Fig. 2 is a longitudinal section of my device.

Fig. 3 is a full section along line 3—3 of Fig. 2 seen in the direction of the arrows; and Fig. 4 is a longitudinal section of another form of my device.

In the drawing (Figs. 1–3) 10 denotes my testing device which comprises a tubular member 11 closed at its top and bottom. Suitably engaged in a threaded opening 12 in said top is a long hollow tube 13 to the top end of which is attached a handle 14. Adapted to slide in said tubular member 11 is a plunger 16 to which is attached a comparatively long rod 17 which projects upwardly through the tube 13 terminating in an operating handle 18 which projects outwardly through slot 19 in said tube 13. The said slot is dimensioned so as to permit a suitable displacement of said plunger in said member 11.

A longitudinal slot 20 in the side wall of said member 11 and extending to the bottom thereof is provided for a purpose hereinafter specified.

Adapted to snugly but slidably fit over the tubular member 11 is a tubular sheath 21 which has dimensions corresponding to those of said member 11 and whereby when said sheath is in its lower or sealing position on said member, liquid contents of said tubular member 11 may be retained therein without danger of leaking. To insure this seal there may be a suitable gasket 22 on the bottom of said member 11 with which cooperates the lower edge 21' of said sheath.

Attached to the upper end of sheath 21 as by screw threaded engagement is a hollow operating tube 23 for said sheath which envelops the tube 13 and is adapted to slide thereon. The said tube 23 is shorter than tube 13 in order that said sheath 21 may slide over the hollow member 11 to expose the slot 20 therein when desired. An open ended slot 23' is provided in the tube 23 which is in alignment with the slot 13' in tube 13 whereby the handle 18 may be freely operated independently of the position of said sheath 21 and tube 23.

My device is operated as follows:

When it is desired to sample the contents of a tank the instrument is put into the tank T with the sheath 21 sealing the opening 20 in member 11 and the plunger 16 raised. When the flat bottom of said member 11 touches the bottom of the tank the sheath 21 is raised by means of tube 23 exposing opening 20 and permitting the contents of said tank to enter said member 11. If the contents are viscous or semi-solid a few turns of the whole device will cause the edges 20' of the slot 20 to shave off sufficient material for test purposes from the mass at the bottom of the tank and gather it into said member 11. Then the sheath is lowered closing the opening 20 and sealing the contents in said member 11. The instrument may then be withdrawn from said tank and the contents removed therefrom for testing purposes by use of said plunger 16. Because of the flat bottom and the extension of the opening 20 to the bottom of said member 11, samples of the material bearing on the very bottom of the tank may be obtained. If desired, to limit the quantity of sample taken, the plunger 20 may be adjusted in member 11 before the sheath is raised in the tank.

In the modification of Fig. 4, I show the testing device without a plunger. The structural features otherwise are identical with those of the modification of Figs. 1-3 except, of course, that in this instance the slots 23' and 13' are omitted and rod 13ª may be solid instead of tubular. In addition to this modification I provide a one way air valve 24 shown in the present instance as a ball check valve, mounted in the top of the member 11. The said valve will let air out of but not into said member 11. I also provide a small opening 25 near the top of sheath 21 in order that air escaping from member 11 may pass therethrough. The device is operated in the same way as the first modification except that no plunger is employed. The air valve 24 merely insures the filling of the member 11 because the air can escape through said valve as the sample flows into said member 11 when the sheath 21 is up and the slot 20 is exposed.

Of course my device may be modified in many ways without departing from the spirit of my invention and I do not wish to be limited to the details shown and described.

What I claim is:

In a testing device, a tubular member closed at its ends, a hollow tube attached to the top of said tubular member and having a handle at its free end, a plunger adapted to slide in said tubular member, a rod attached to said plunger and extending upwardly through said hollow tube, said rod having a handle at its upper end projecting through a slot in said tube, said tubular member being formed with a longitudinal recess extending from its bottom, a tubular sheath adapted to snugly but slidably fit over said tubular member, and a hollow operating tube extending from the top of said sheath which envelopes said first named hollow tube and is slidable thereon, said hollow operating tube being shorter than said first named hollow tube and having a slot in alignment with said first named slot.

Signed at New York this 12th day of June, 1929.

ROBERT STERN.